(12) United States Patent
Lee et al.

(10) Patent No.: US 7,318,117 B2
(45) Date of Patent: *Jan. 8, 2008

(54) MANAGING FLASH MEMORY INCLUDING RECYCLING OBSOLETE SECTORS

(75) Inventors: Charles C. Lee, Sunnyvale, CA (US); Ben-Wei Chen, Fremont, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/789,333

(22) Filed: Feb. 26, 2004

(65) Prior Publication Data

US 2005/0193161 A1  Sep. 1, 2005

(51) Int. Cl.
*G06F 13/00* (2006.01)
*G06F 12/00* (2006.01)

(52) U.S. Cl. .................. 711/103; 711/115; 711/159; 711/170

(58) Field of Classification Search ............ 711/103, 711/5, 161, 165, 170, 168, 115, 159, 109
See application file for complete search history.

(56) References Cited

U.S. PATENT DOCUMENTS

| | | | |
|---|---|---|---|
| 5,404,485 A | 4/1995 | Ban | |
| 5,479,638 A | 12/1995 | Assar et al. | |
| 6,000,006 A | 12/1999 | Bruce et al. | |
| 6,148,354 A | 11/2000 | Ban et al. | |
| 2002/0036922 A1* | 3/2002 | Roohparvar | 365/185.11 |
| 2003/0177300 A1* | 9/2003 | Lee et al. | 711/103 |
| 2003/0182528 A1* | 9/2003 | Ajiro | 711/167 |
| 2005/0114587 A1* | 5/2005 | Chou et al. | 711/103 |
| 2005/0182858 A1* | 8/2005 | Lo et al. | 710/1 |
| 2005/0193161 A1* | 9/2005 | Lee et al. | 711/103 |
| 2005/0193162 A1* | 9/2005 | Chou et al. | 711/103 |
| 2005/0216624 A1* | 9/2005 | Deng et al. | 710/74 |

\* cited by examiner

*Primary Examiner*—Hong Kim
(74) *Attorney, Agent, or Firm*—Bever, Hoffman & Harms, LLP; Patrick T. Bever

(57) ABSTRACT

A flash memory controller is disclosed. The flash memory controller includes a processor for receiving at least one request from a host system. The flash memory controller further includes an index comprising information regarding sectors of a flash memory. The processor can utilize the index to determine the sectors of the flash memory that are available for programming, reprogramming, or reading. In another aspect of the present invention, the flash memory controller further includes a first-in-first-out unit (FIFO) for recycling obsolete sectors so that they are available for reprogramming.

2 Claims, 15 Drawing Sheets

702

| Byte \ bit | 7 | 6 | 5 | 4 | 3 | 2 | 1 | 0 |
|---|---|---|---|---|---|---|---|---|
| 0 - 3 | CBW Signature (43 42 53 55h, 55 is byte 0) ||||||||
| 4 - 7 | CBW Tag ||||||||
| 8 - 11 (08h - 0Bh) | CBW Data Transfer Length ||||||||
| 12 (0Ch) | CBW Flags ||||||||
| 13 (0Dh) | 0h (Reserved) |||| CBW LUN ||||
| 14 (0Eh) | 0h (Reserved) |||| CBW CB Length ||||
| 15 - 30 (0Fh - 1Eh) | CBW CB ||||||||

FIG.7A

| Byte \ bit | 7 | 6 | 5 | 4 | 3 | 2 | 1 | 0 |
|---|---|---|---|---|---|---|---|---|
| 0 | Operation Code (28h as read example) ||||||||
| 1 | Reserved ||| Service Action |||||
| 2 | MSB ||||||||
| 3 | ||||||||
| 4 | LBA ||||||||
| 5 | (Logical Block Address)    LSB ||||||||
| 6 | Reserved ||||||||
| 7 | MSB  Transfer Length (unit is sector) ||||||||
| 8 | LSB ||||||||
| 9 | Control (00h) ||||||||

| Byte \ bit | 7 | 6 | 5 | 4 | 3 | 2 | 1 | 0 |
|---|---|---|---|---|---|---|---|---|
| 0 - 3 | CSW Signature (53 42 53 55h, 55h is byte 0) ||||||||
| 4 - 7 | CSW Tag ||||||||
| 8 - 11 (08h - 0Bh) | CSW Data Transfer Length ||||||||
| 12 (0Ch) | CSW Flags ||||||||

MANAGING FLASH MEMORY INCLUDING RECYCLING OBSOLETE SECTORS

FIELD OF THE INVENTION

The present invention relates to memory systems, and more particularly to a system and method for controlling flash memory.

BACKGROUND OF THE INVENTION

As flash memory technology becomes more advanced, flash memory is replacing traditional magnetic hard disks as storage media for mobile systems. Flash memory has significant advantages over magnetic hard disks such as having high-G resistance and low power dissipation. Because of the smaller physical sizes of flash memory, they are also more conducive to mobile systems. Accordingly, the flash memory trend has been growing because of its compatibility with mobile systems and low-power feature.

New generation personal computer (PC) card technologies have been developed that combine flash memory with architecture that is compatible with the Universal Serial Bus (USB) standard. This has further fueled the flash memory trend because the USB standard is easy to implement and is popular with PC users. In addition to replacing hard drives, flash memory is also replacing floppy disks because flash memory provides higher storage capacity and faster access speeds than floppy drives.

However, the USB standard has several features that require additional processing resources. These features include fixed-frame times, transaction packets, and enumeration processes. For better optimization, these features have been implemented in application-specific integrated circuits (ASICs).

A problem with a USB mass-storage devices is that they are slow. The USB interface is significantly slower than IDE interface in particular. This is because of the overhead associated with the USB standard, which include additional resources required for managing USB commands and handshake packets. Bulk-only transactions introduced by the USB standard have relieved some resources but only if the USB traffic is not too busy.

In addition to the limitations introduced by the USB standard, there are inherent limitations with flash memory. First, flash memory sectors that have already been programmed must be erased before being reprogrammed. Also, flash memory sectors have a limited life span; i.e., they can be erased only a limited number of times before failure. Accordingly, flash memory access is slow due to the erase-before-write nature and ongoing erasing will damage the flash memory sectors over time.

To address the speed problems with USB-standard flash memory, hardware and firmware utilize existing small computer systems interface (SCSI) protocols so that flash memory can function as mass-storage devices similarly to magnetic hard disks. SCSI protocols have been used in USB-standard mass-storage devices long before flash memory devices have been widely adopted as storage media. Accordingly, the USB standard has incorporated traditional SCSI protocols to manage flash memory.

A problem with SCSI protocols is that they do not include an erase command to address the erase-before-write nature of flash memory. Accordingly, the erase operation is handled by the host system, which further ties up the host system resources.

Some solutions have been introduced that involve new USB packet definitions such as write flash, read flash, and erase flash definitions. However, these definitions are not an efficient way to handle flash memory because they introduce additional protocols that require additional computing resources at the host system. They also do not address the sector-wear issues.

Another solution provides a driver procedure for flash memory write transactions. This procedure has three different sub-procedures. Generally, the data of a requested flash memory address is first read. If there is data already written to that address, the firmware executes an erase command. Then, if the erase command executes correctly, the firmware executes a write request. However, this driver procedure utilizes protocols that require additional computing resources at the host system.

Another solution provides a flash sector format that has two fields: a data field and a spare field. The spare field contains control data that include flags that facilitate in the management of the sectors. However the flags introduce ASIC complexity when the host system writes to the sectors.

Disadvantages of many of the above-described and other known arrangements include additional host system resources required to process special protocols and the resulting added processing time required for managing flash memory.

Accordingly, what is needed is an improved system and method for controlling flash memory. The system and method should be able to comply with the USB standard, should be suitable for ASIC hardware implementation, and should be simple, cost effective and capable of being easily adapted to existing technology. The present invention addresses such a need.

SUMMARY OF THE INVENTION

A flash memory controller is disclosed. The flash memory controller comprises a processor for receiving at least one request from a host system. The flash memory controller further comprises an index comprising information regarding sectors of a flash memory. The processor can utilize the index to determine the sectors of the flash memory that are available for programming, reprogramming, or reading. In another aspect of the present invention, the flash memory controller further comprises a first-in-first-out unit (FIFO) for recycling obsolete sectors so that they are available for reprogramming.

According to the system and method disclosed herein, the host system interacts with the flash memory controller without the host system having information regarding the configuration of the flash memory. Consequently, speeds at which data is written to and read from flash memory is significantly increased while the flash memory remains compatible with the USB standard and ASIC architecture.

BRIEF DESCRIPTION OF THE DRAWINGS

FIGS. 7A-C are block diagrams showing a command block wrapper, a reduced block command read format, and a command status wrapper in accordance with the present invention.

DETAILED DESCRIPTION

Definitions

Figure 1:
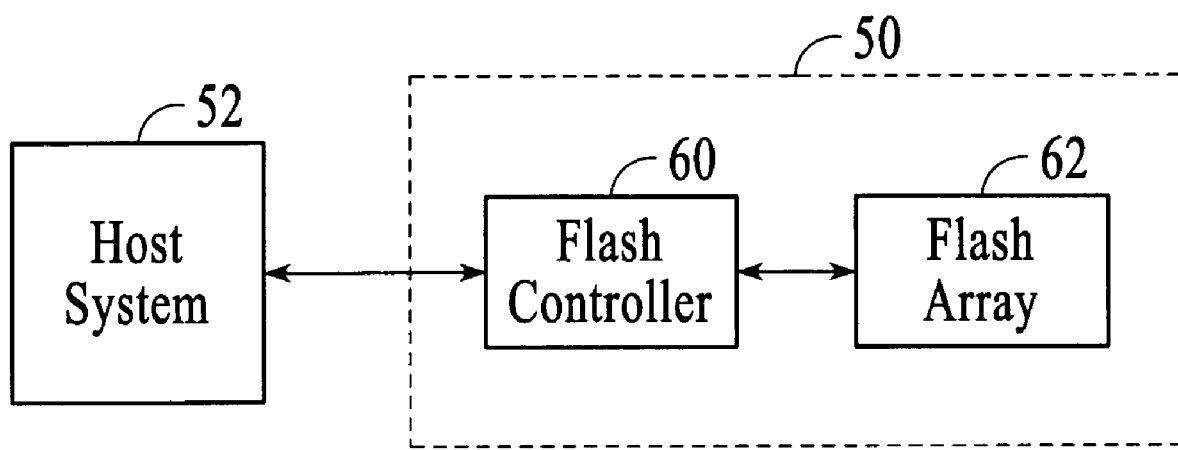
FIG. 1 is a block diagram of a conventional flash memory system coupled with a host system.

The following terms are defined in accordance with the present invention.

Block: A basic memory erase unit. Each block contains numerous sectors, e.g., 16, 32, 64, etc. If any sector encounters write error, the whole block is declared a bad block and all valid sectors within the block are relocated to another block.

Sector: A sub-unit of a block. Each sector typically has two fields—a data field and a spare field.

Obsolete sector: A sector that is programmed with data but the data has been subsequently updated. When the data is updated, the obsolete data remains in the obsolete sector and the updated data is written to new sectors, which become valid sectors.

Non-valid blocks: Blocks that contain obsolete or redundant sectors.

Valid sector: A sector that has been programmed with data and the data is current, i.e., not obsolete.

Wear leveling: A method for evenly distributing the number times each block of flash memory is erased in order to prolong the life of the flash memory. Flash memory can be block erased only a limited number of times. For example, one million is a typical maximum number of erases for NAND flash memory.

Spare blocks: Reserved space in flash memory. Spare blocks enable flash memory systems to prepare for bad blocks.

Cluster: Multiple data sectors used as file access pointers by an operating system to improve memory performance. In small mass-storage memory operation, a cluster normally is a combination of two data sectors, which is a minimum file size unit. 1 k byte is a typical cluster size for small blocks of memory (i.e., 512 bytes per sector), and 4 k bytes is a cluster size for larger blocks of memory (i.e., 2,112 bytes per sector).

FAT: File allocation table having file address-linked pointers. A cluster is the unit for a FAT. For example, FAT16 means that a cluster address can be 16 bits.

Directory and subdirectory: File pointers as defined by an operating system.

Master boot record (MBR): A fixed location to store a root directory pointer and associated boot file if bootable. This fixed location can be the last sector of the first block, or the last sector of the second block if first block is bad.

Packet: A variable length format for a USB basic transaction unit. A normal transaction in the USB specification typically consists of three packets—a token packet, a data packet, and a handshake packet. A token packet has IN, OUT, and SETUP formats. A data packet size can be varying in size, e.g., 64 bytes in USB revision 1.1, and 512 bytes in USB revision 2.0. A handshake packet has ACK or NAK formats to inform host of the completion of a transaction.

Frame: A bulk transaction that is used that has a high priority for occupying a frame if USB traffic is low. A bulk transaction can also wait for a later frame if USB traffic is high.

Endpoint: Three endpoints include control, bulk-in, and bulk-out. The control endpoint is dedicated to system initial enumeration. The bulk-in endpoint is dedicated to host system read data pipe. The bulk-out endpoint is dedicated to a host system write data pipe.

Command block wrapper (CBW): A packet contains a command block and associated information, such as DataTransferLength (512 bytes for example from byte 8-11). A CBW always starts at the packet boundary, and ends as short packet with exactly 31 bytes transferred. All CBW transfers shall be ordered with LSB (byte 0) first.

Command Status Wrapper (CSW): A CSW starts at packet boundary.

Reduced block command (RBC) SCSI protocol: a 10 byte command descriptor.

Present Invention

The present invention relates to memory systems, and more particularly to a system and method for controlling flash memory. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention for controlling flash memory are disclosed. The system and method provide a flash memory controller comprising a processor for receiving at least one request from a host system, and an index, which comprises look-up tables (LUTs) and a physical usage table (PUT). The index translates logical block addresses (LBAs) provided by the host system to physical block addresses (PBAs) in the flash memory. The index also contains intelligence regarding the flash memory configuration. The processor can utilize the index to determine the sectors of the flash memory that are available for programming, reprogramming, or reading. The flash memory controller further comprises a recycling first-in-first-out (FIFO) that recycles blocks of obsolete sectors so that they are available for reprogramming. The recycling operation involves copy and erase operations, and is performed in the background and thus hidden from the host system. Accordingly, the management of the flash memory and related intelligence resides in the flash memory controller instead of in the host system. As a result, the host system interacts with the flash memory controller without the host system having information regarding the configuration of the flash memory. Consequently, speeds at which data is written to and read from the flash memory is significantly increased while the flash memory remains compatible with the USB standard and ASIC architecture.

Although the present invention disclosed herein is described in the context of the USB standard, the present invention may apply to other standards and still remain within the spirit and scope of the present invention.

To more particularly describe the features of the present invention, refer now to the following description in conjunction with the accompanying figures.

FIG. 1 is a block diagram of a conventional flash memory system 50 coupled with a host system 52. The flash memory system 50 includes a flash memory controller 60 and a flash memory 62. In operation, the host system 52 sends write and read requests to the flash memory controller 60. Data is written to and read from the flash memory 62. The host system 50 provides resources to process write and read transactions, and erase operations via the flash memory controller 60.

Figure 2:
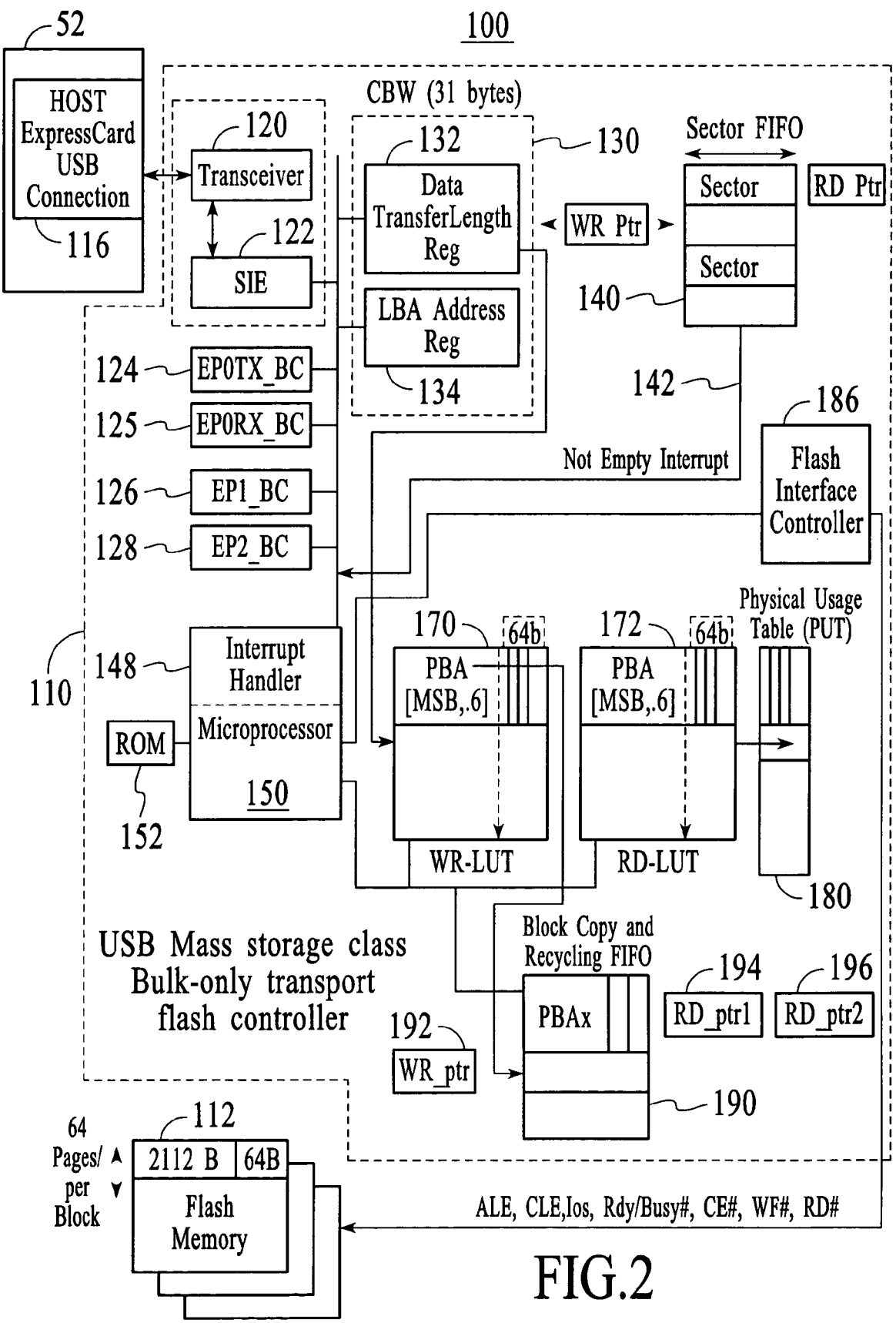
FIG. 2 is a block diagram of a flash memory system including a flash memory controller and a flash memory in accordance with the present invention.

FIG. 2 is a block diagram of a flash memory system 100 including a flash memory controller 110 and a flash memory 112 in accordance with the present invention. The flash memory controller 110 is coupled to a host system 52 via a host system interface 116. The host system 52 can be a personal computer or other type of computer system. The operating system of the host system 52 can be Windows or MacOS but is not limited to these operating systems. In this specific embodiment, the flash memory system 100 complies with the USB mass-storage class standard and the host system interface 116 is a USB connection. The USB specification can be revision 1.1 or 2.0 and above. The flash memory controller 110 and the flash memory 112 can be either bus-powered or self-powered, and can be used as a mass storage device. The advantage of being used as a mass storage device is that it is a low-power device, it is easy to carry, and it has storage capacity larger than a traditional floppy disk.

The flash memory controller 110 includes a device transceiver 120, which converts analog signals to digital streams and provides a phase lock loop (PLL) circuit for generating precision clocks for internal data latching. For USB 2.0, the PLL functionality can be sensitive and thus useful due to its operating at 480 MHz. The flash memory controller 110 also includes a serial interface engine (SIE) 122, which provides serial and parallel data conversion, packet decoding/generation, cyclic redundancy code (CRC) generation/checking, non-return-to-zero (NRZI) encoding/decoding, and bit stuffing according to the USB standard. Endpoints 124 and 125 receive information from the host system 52 regarding class type (e.g., mass-storage class), flash memory configuration information, and default control information. An Endpoint 126 receives information from the host system 52 regarding read transactions, and an endpoint 126 receives information from the host system 52 regarding write transactions. A bulk-only transport (BOT) unit 130 receives command block wrappers (CBW) and includes a data transfer length register 132 and a logical block address (LBA) register 134.

A sector FIFO 140 provides a caching feature when the host system 52 attempts to write data to the flash memory 112. A FIFO-not-empty interrupt signal 142 triggers an interrupt routine at an interrupt handler 148 of a processor 150. The interrupt routine responds to the host system 52 confirming that data was written to the flash memory 112. In the mean time, the processor 150 executes a write transaction.

The processor 150 executes firmware stored in a read only memory (ROM) to respond to requests from the host system 52 and to access the flash memory 112. While the specific type of processor will depend on the specific application, in a preferred embodiment, the processor 150 is an 8-bit or 16-bit processor.

A write look-up table (LUT) 170, a read LUT 172, and a physical usage table (PUT) 180 provide an index showing the configuration of the flash memory 112. The write and read LUTs 170 and 172 facilitate write and read transactions, respectively, between the host system 52 and the flash memory 112. The write and read LUTs 170 and 172 translate logical block addresses (LBAs) provided by the host system 52 to physical block addresses (PBAs) of the flash memory 112. The PUT 180 performs physical sector mapping and provides a bitmap indicating programmed sectors, i.e., sectors to which data has already been written.

A flash interface controller 186 interfaces with the flash memory 112 to carry out commands from the processor 150. The flash interface controller 186 receives PBAs from the write and read LUTs 170 and 172 to service write and read requests.

A recycling FIFO 190 recycles blocks of obsolete sectors so that they can be reprogrammed, i.e., written to with new data. The recycling operations are executed immediately after and independently from write transactions so as to not interfere with the servicing of write transactions by the flash memory controller 100.

For optimal ASIC implementation, the write and read LUTs 170 and 172, the PUT 180, and the recycling FIFO 190 are implemented with volatile random access memory (RAM), such as synchronous RAM (SRAM). The flash memory 112 can be implemented using one or more devices, each having one or more flash arrays.

Figure 3:
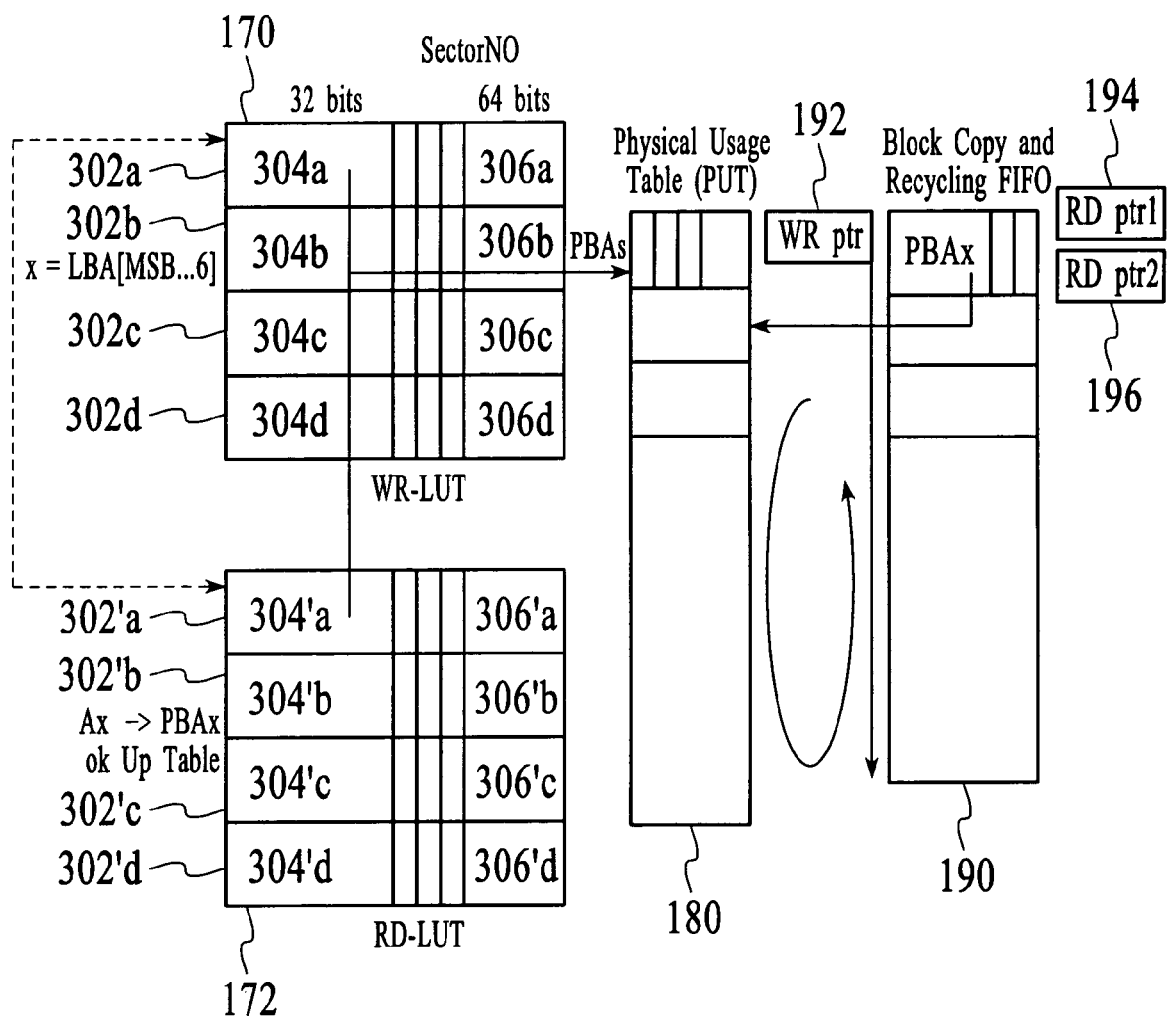
FIG. 3 is a block diagram showing in more detail the write look-up table, the read look-up table, the physical usage table, and the recycling first-in-first-out unit of FIG. 2 in accordance with the present invention.

FIG. 3 is a block diagram showing in more detail the write LUT 170, the read LUT 172, the PUT 180, and of recycling FIFO 190 of FIG. 2 in accordance with the present invention. The write LUT 170 provides an index for the flash memory during write transactions and translates LBAs provided by the host system to PBAs of the flash memory. The write LUT 170 contains LBAs 302*a*, 302*b*, 302*c*, and 302*d*. For ease of illustration, only four LBAs per LUT are shown. Each of the LBAs 302*a-d* includes optional block-offset bits (bit5 to bit0). The block-offset bits correspond to particular sectors in a block.

Each LBA 302*a-d* is associated with a PBA 304*a-d*. Accordingly, each LBAa-d points to a PBAa-d, respectively. In this specific example, a PBA is 32-bits long. A sector field 306 contains a sector number indicating valid sectors.

The write LUT 170 records only the starting LBA for a particular write transaction. For example, if a particular write transaction requires two or more blocks, the write LUT 170 records the starting LBA.

The read LUT 172 provides an index for the flash memory during read transactions and translates LBAs provided by the host system to PBAs of the flash memory. The read LUT 172 contains LBAs 302'a, 302'b, 302'c, and 302'd. The read LUT 172 has the same fields as the write LUT 170. After the completion of each write transaction, the read LUT 172 is updated to reflect the changes to the write LUT 170 such that the write and read LUTs 170 and 172 become identical. Once the read LUT is updated, it can be used as an index for read transactions.

The PUT 180 performs physical sector mapping and provides a bitmap indicating programmed sectors, i.e., sectors to which data has already been written. Whenever a write transaction occurs, the PUT 180 records the usage information indicating the programmed sectors. This facilitates write transactions in that the processor of the flash memory controller can determine from the PUT 180 which sectors are available for programming or reprogramming.

The recycling FIFO 190 recycles blocks of obsolete and redundant sectors and the recycling process occurs after each successful write transaction. Whenever a block having an obsolete or redundant sector is encountered, information regarding that block is placed in the recycling FIFO 190. Such information indicates which sectors are obsolete and which sectors are redundant. The recycling FIFO 190 performs valid-sector copy and non-valid block erase operations. Non-valid blocks are blocks that contain obsolete or redundant sectors. The recycling FIFO 190 uses a write pointer 192 and read pointers 194 and 196. The copy and erase operations are performed in the background, i.e., independently from write transactions so as to not interfere with the write transactions.

Figure 4:
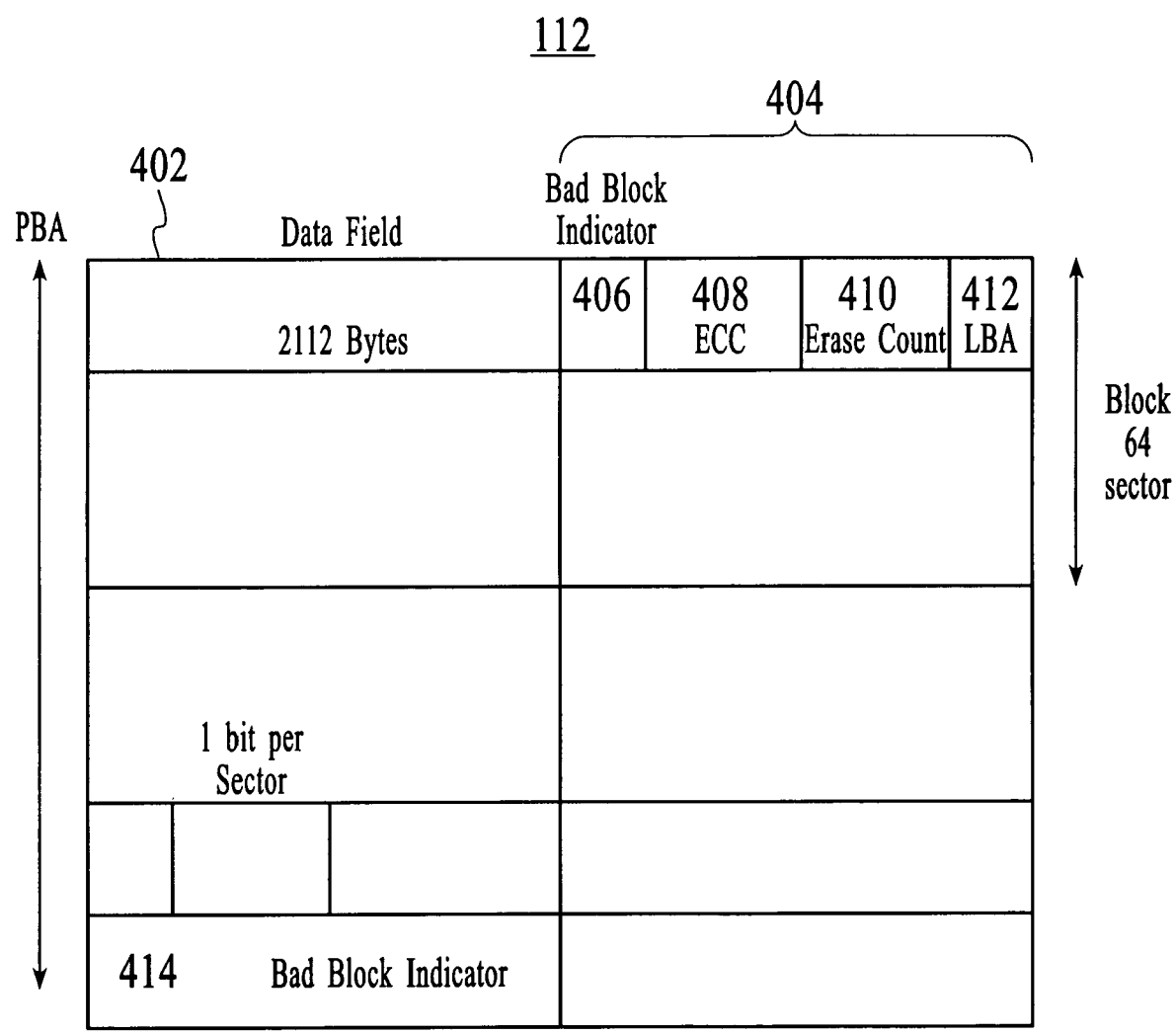
FIG. 4 is a block diagram showing in more detail the flash memory of FIG. 2 in accordance with the present invention.

FIG. 4 is a block diagram showing in more detail the flash memory 112 of FIG. 2 in accordance with the present invention. The flash memory 112 has a data structure that comprises a data field 402 and a spare field 404 for each PBA. Each field holds a certain number of bytes and the specific number will depend on the application. For example, a data field may have 512 bytes, 2,112, or more bytes, and the spare field can have 16, 64, or more bytes.

The data field 402 stores raw data and the spare field 404 stores information related to memory management. The spare field 404 includes a bad block indicator field 406, an error correction code (ECC) field 408, an erase count field 410, and an LBA field 412. Because the LUT and PUT tables 170, 172, and 180 are stored volatile memory and thus do not preserve the valid sector information, the LBA field 412 is used to reconstruct the write and read LUTs 170, 172 and the PUT 180 during system initialization and power failure.

The bad block indicator field 406 indicates bad blocks. A bad block occurs when an attempt to write to a particular sector or to erase a particular block fails. A special bad block indicator field 414 is located at the last block, a location, which is easier for the firmware to read, especially where there is one bit per sector. In this specific embodiment, 64 bits are used for a physical block to record the write sector failure (64 bits×4096 blocks=32 K bytes=16 sectors=quarter block). Any 1s within a block means that the particular block is bad. To maintain reliability, four copies of bad block indicators are saved in the last block of the flash memory. Of course fewer or more copies can be utilized.

The need for flags in the flash memory is eliminated by the present invention. The only flag used is the valid sector flag used in the LUTs to assist in firmware decision making. This minimizes the complexity with regard to write and read transactions.

Figure 5:
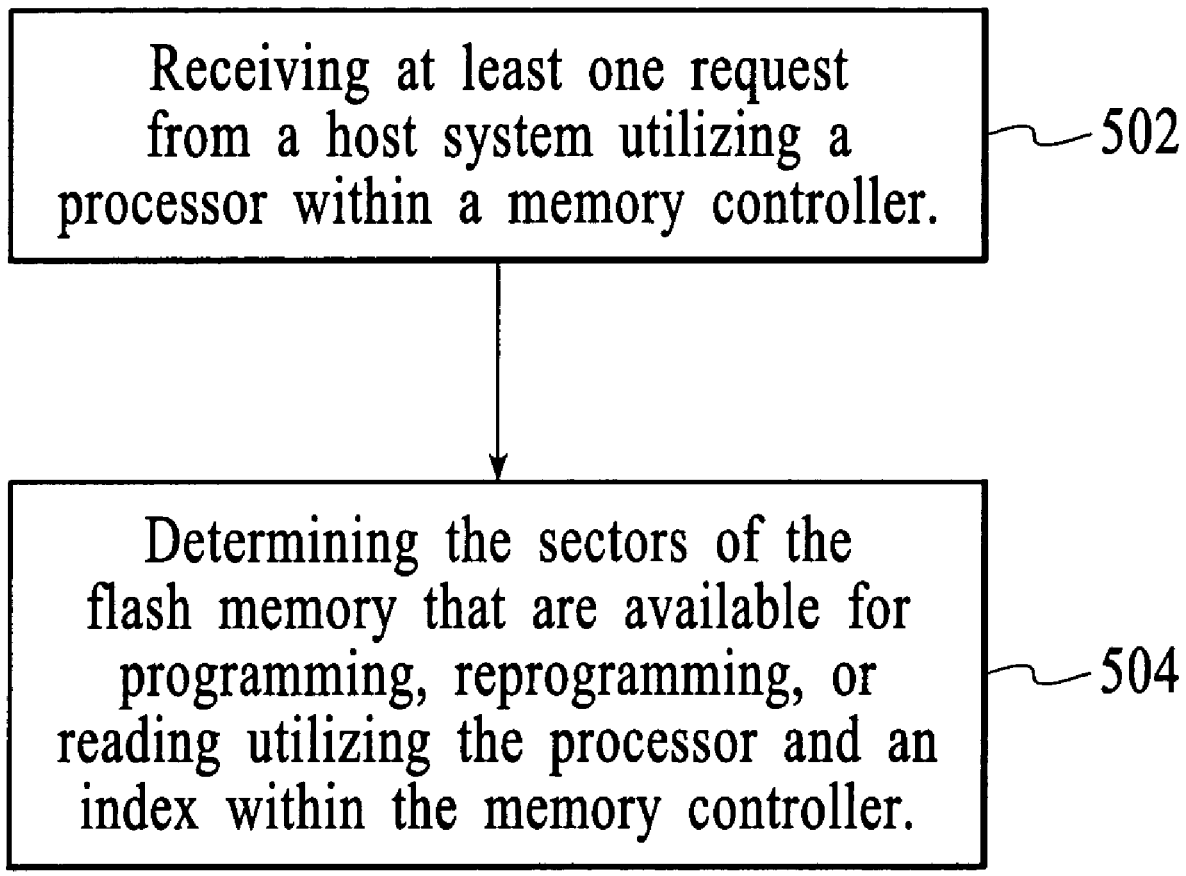
FIG. 5 is a high-level flow chart showing a method for managing flash memory in accordance with the present invention.

FIG. 5 is a high-level flow chart showing a method for managing flash memory in accordance with the present invention. First, at least one request from a host system is received utilizing a processor within a memory controller, in a step 502. The request can be a write or read request. Then, the sectors of the flash memory that are available for programming, reprogramming, or reading are determined utilizing the processor and an index within the memory controller, in a step 504. The host system interacts with the flash memory controller without the host system having information regarding the configuration of the flash memory.

In a specific embodiment, the flash memory controller receives a request from the host system in compliance with the USB mass-storage class. The following description illustrates this specific embodiment.

Figure 6:
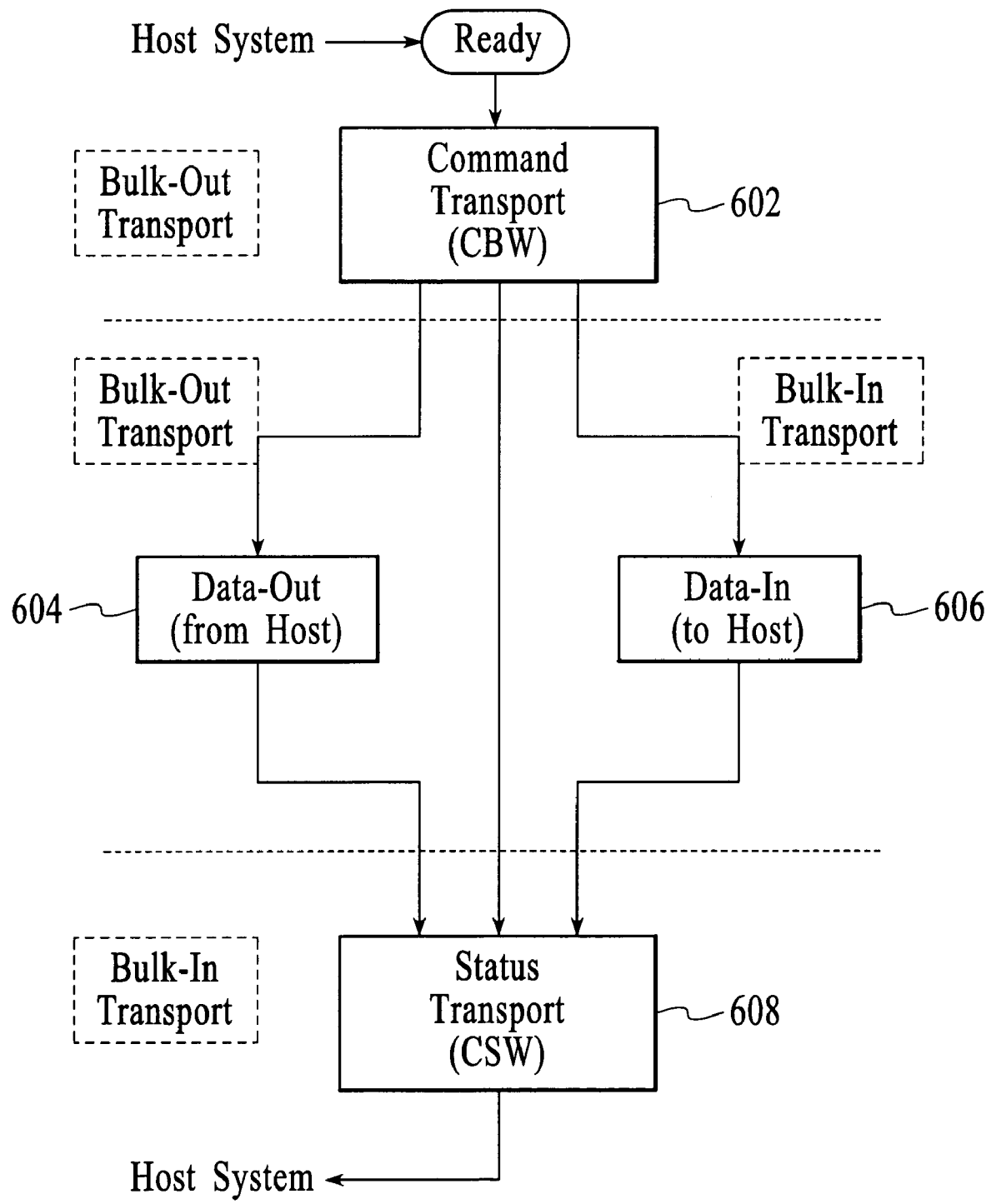
FIG. 6 is a flow chart showing a method for transmitting USB mass-storage class service requests in accordance with the present invention.

FIG. 6 is a flow chart showing a method for transmitting USB mass-storage class service requests in accordance with the present invention. First, the memory controller receives a request from the host system, in a step 602. This step can be referred to as a command transport step 602. The request can be a write or read request. If the request is a write request, a write transaction is performed, in a step 604. This step can be referred to as a data-out step 604. If the request is a read request, a read transaction is performed, in a step 606. This step can be referred to as a data-in step 606. Upon completion of a write or read transaction, an acknowledge packet is sent to the host system by the memory controller to confirm completion of the transaction, in a step 608. This step can be referred to as a status transport step 608.

The command transport step 602 and the data-out step 604 our are generally referred to as bulk-out transport steps since data packets are sent out from the host system. The data-in step 606 and the status transport step 608 are generally referred to as bulk-out transport steps since data packets are sent into the host system.

FIGS. 7A-C are block diagrams showing a command block wrapper (CBW) 702, a reduced block command read format (RBC) 704, and a command status wrapper (CSW) 706 in accordance with the present invention. The USB standard involves three packets per request, which include the CBW 702, the RBC 704, and the CSW 704. The CBW 702, the RBC 704, and the CSW 704 packets are also generally referred to as token, data, and acknowledge handshake packets, respectively, and are utilized in the command transport, data-in/out, and status transport steps 602-608 of FIG. 6, respectively.

Still referring to FIGS. 7A-C, the CBW 702 contains information regarding what data from the host system is to follow. The CBW 702 is 31 bytes long and includes command decoding and direction, and a unique LBA. The LBA in the CBW 702 can include information regarding the file allocation table (FAT) and directory pointers. The CBW 702 also contains the read/write direction in byte 15 as part of the RBC command. The RBC 704 contains information such as data to be written to the flash memory. The RBC 704 is a SCSI RBC. The length of the data can vary and is defined by different USB standard versions, e.g., 64 bytes in USB 1.1, 512 bytes in USB 2.0. The CSW 704 contains information regarding acknowledge procedures and information for terminating a transaction. Byte 12 is a status byte.

Table 1 shows an example of information that could be contained in the three packets CBW 702, RBC 704, and CSW 704

TABLE 1

| Packet 0 | | | | | |
|---|---|---|---|---|---|
| (CBW) | SYNC | Out | Addr | Endpoint | CRC5 |

TABLE 1-continued

| | 0000 0001 | 0x87 | 3 | 1 | 0x07 |
|---|---|---|---|---|---|
| Packet 1 (RBC) | SYNC | Data1 | Data | | CRC16 |
| | 0000 0001 | 0xD2 | 0000:55 53 42 43 28 E8 31 FE | | 0xBA5D |
| | | | 0008:00 02 00 00 80 00 0A 28 | | |
| | | | 0016:00 00 00 00 00 00 00 01 | | |
| | | | 0024:00 00 00 00 00 00 00 | | |
| Packet 2 (CSW) | SYNC | Ack | | | |
| | 0000 0001 | 0x4B | | | |

Figure 8:
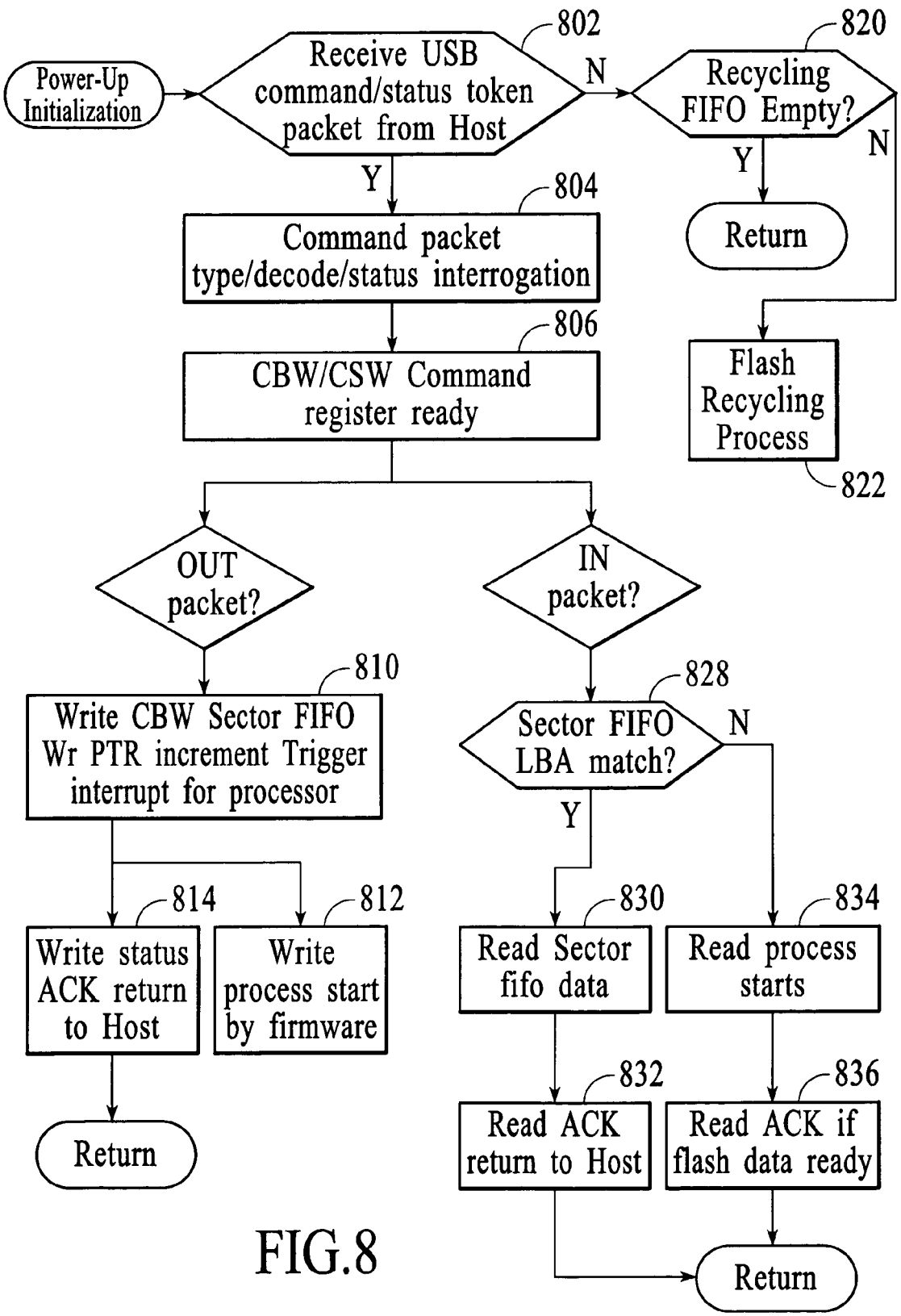
FIG. 8 is a flow chart showing a method for reading, writing, and erasing in accordance with the present invention.

FIG. 8 is a flow chart showing a method for reading, writing, and erasing in accordance with the present invention. Referring to FIGS. 7A-C and 8 together, first, a request is received from the host system, in a step 802. To comply with the USB standard, the request includes the CBW 702, the RBC 704, and the CSW 706. Next, the type of command, whether a write or read request, is determined, in a step 804. Next, registers for the CBW and CSW are initialized, in a step 806.

If the request is a write request for a write transaction, the sector data FIFO in the flash memory controller is filled, and when 512 bytes of data are ready, a write pointer for the sector data FIFO is incremented and an interrupt is sent to the processor in the flash memory controller, in a step 810. Next, the write transaction is executed, in a step 812. Finally, an acknowledge packet is sent to the host system confirming that the write transaction was successfully completed, in a step 814.

Immediately after a successful write transaction, the firmware of the flash memory controller checks the recycling FIFO status, in a step 820. If the recycling FIFO is not empty, the recycling FIFO recycles obsolete sectors, in a step 822.

If the request is a read request for a read transaction, the LBA in the CBW is compared with all exist entries of the sector FIFO, in a step 828. If there is a match, the requested data is returned to the host system, in a step 830. Next, an acknowledge packet is sent to the host system confirming that the read transaction was successfully completed, in a step 832. If there is no match, the requested data is read from the flash memory, in a step 834. Finally, a status/acknowledge packet is sent to the host system confirming that the read transaction was successfully completed, in a step 836.

Figure 9:
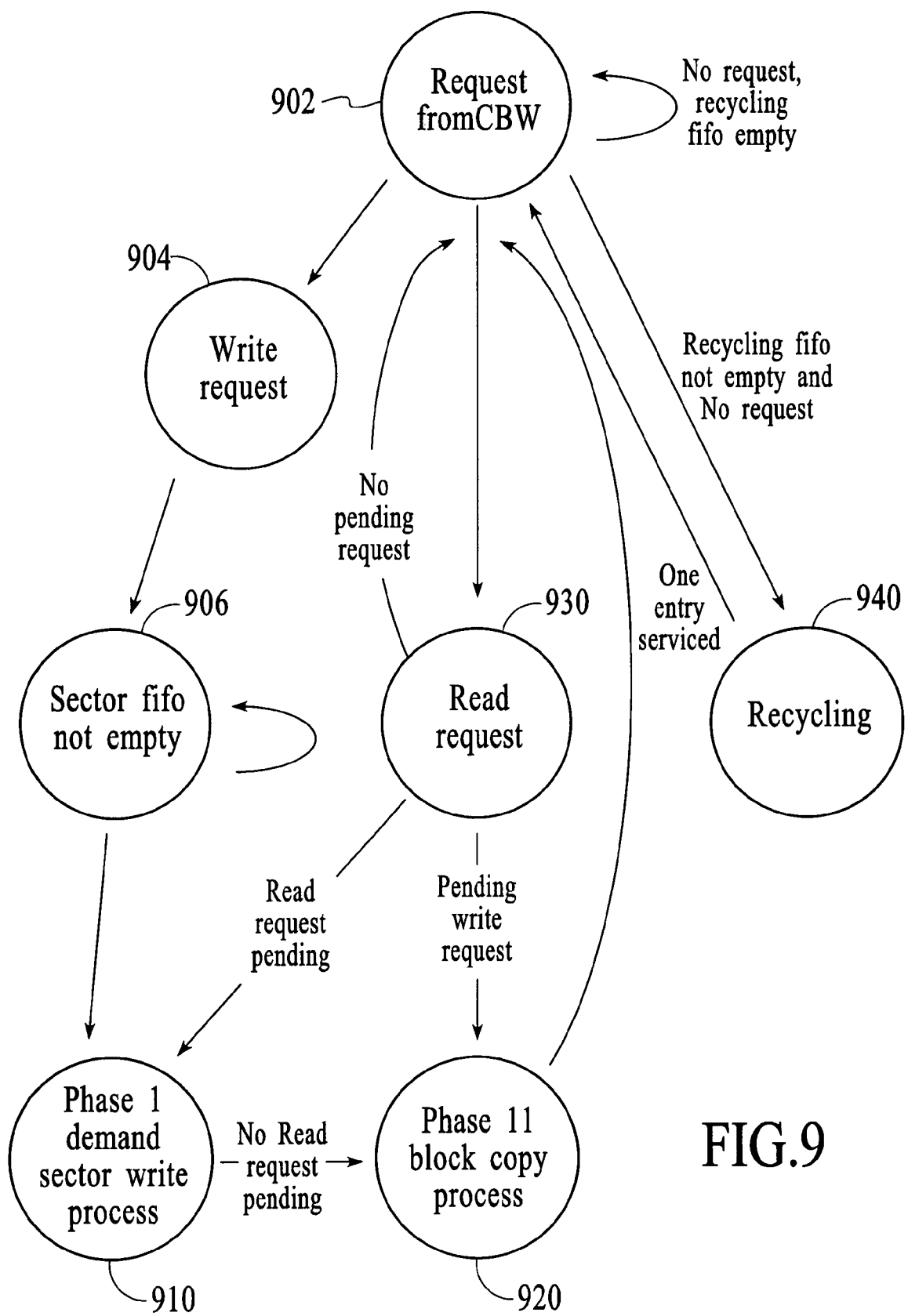
FIG. 9 is a high-level flow chart showing a method including a first phase of a write transaction, a second phase of the write transaction, a read transaction, and a recycling operation in accordance with the present invention.

FIG. 9 is a high-level flow chart showing a method including a first phase of a write transaction, a second phase of the write transaction, a read transaction, and a recycling operation in accordance with the present invention. First, a CBW is received, in a step 902. Next, it is determined whether the request is a write request, in a step 904. Next, if the request is a write request, the sector FIFO is checked, in a step 906. If the sector FIFO is not empty, the write transaction is then initiated.

To maintain block address consistency and to achieve write efficiency, the write transaction has two phases. In the first phase, data is written to a particular number of sectors and an acknowledge packet is then sent to the processor of the flash memory controller and to the host system indicating that the write transaction has been completed, in a step 910.

If there is no subsequent read request pending, the second phase of the write transaction is initiated. Accordingly, valid sectors are copied from a non-valid block to a new address in another block, in a step 920. The copy step 920 is accomplished in the background to maintain data coherency.

If it is determined that the request is a read request and if there is a read request pending upon the completion of the first phase of the write transaction, the requested data is fetched from the flash memory using the PBA in the read LUT, in a step 930. After the read request is serviced, and if there is a pending second phase of a write request, the second phase is executed, in the step 920.

Obsolete sectors are recycled by the recycling FIFO, in a step 940, when there are no requests being serviced. In a specific embodiment, when the recycling FIFO completes the task of erasing one block, the firmware of the flash memory controller can return to servicing other requests from the host system.

Figure 10:
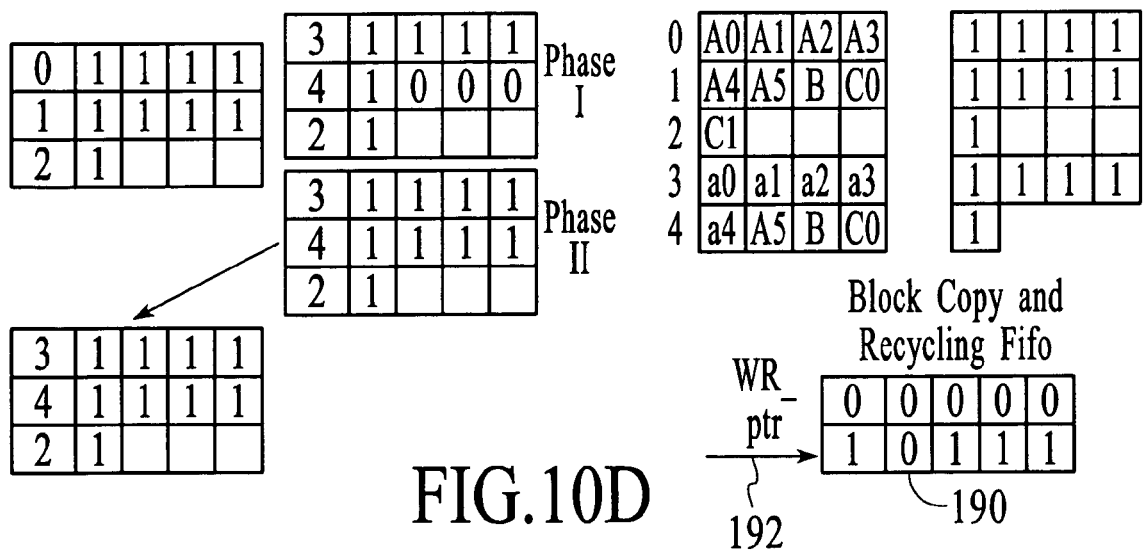
FIGS. 10A-D are block diagrams illustrating exemplary results from first and second phases of a write transaction in accordance with the present invention.

FIGS. 10A-D are block diagrams illustrating exemplary results from first and second phases of a write transaction in accordance with the present invention. To further clarify the above-described features of the present invention, the following example is provided. FIGS. 10A-D show are four write transactions including varying-length data strings. FIG. 10D shows a write transaction where data is updated. For ease of illustration, only four sectors per block are shown.

Two blocks (PBA 0 and PBA 1) of the flash memory 112 have four sectors each. In a first write transaction, the write LUT 170 writes to six physical sectors of the flash memory 112, beginning the first physical block (PBA 0). For this example, it is presumed that the flash memory 112 is initially empty. For the purpose of this example, the labels A0-A5 represent data written during the first write transaction.

Bits in the PUT 180 corresponding the sectors of the flash memory 112 show a 1 to indicate that those sectors have been programmed, i.e., occupied. The firmware of the flash memory controller utilizes the PUT 180 to determine the available sectors. Accordingly, those sectors have data that cannot be reprogrammed until first erased but those sectors can be later read. The write LUT 170 having written to the sectors indicates the valid sectors with 1s. The read LUT 172 information is copied from the write LUT 170 information to reflect the most recent changes. However, the read LUT 172 is copied from the previous version of the write LUT 170 and is ultimately synchronous with the write LUT 170 once the write phases are completed. Accordingly, until the read LUT 172 is updated, it will show the pre-update information of the write LUT 170 with 0s shown to indicate empty sectors.

Referring to FIG. 10B, the write LUT 170 has written new data B in the next available sector in PBA 1. This is the second write transaction. The write LUT 170, the PUT 180, and flash memory block reflect this update. The read LUT 172 has been updated with the prior change but has not yet been updated to reflect the current change.

Referring to FIG. 10C, the write LUT 170 has written new data C0 and C1 to the next available sectors. This is the third write transaction. Note that the data C0 and C1 cross the block boundary as does the data A0-A5. Again, the write LUT 170, the PUT 180, and flash memory blocks reflect this update. The read LUT 172 has been updated with the prior change but has not yet been updated to reflect the current change.

Referring to FIG. 10D, the write LUT 170 has written data to update existing data A0-A4 with updated data a0-a4. This is the fourth transaction. Because the blocks PBA 0 and PBA 1 need to first be erased before being reprogrammed, the updated data a0-a4 are written to the same sector number but to the next available block, i.e., PBA 3-4, in the first phase of the write transaction. Once the first write phase is complete, acknowledge packets can then be sent to the processor of the flash memory controller confirming completion of the first phase of the write transaction. The write LUT 170, the PUT 180, and the flash memory blocks reflect this update, and the read LUT 172 has been updated with the prior change but has not yet been updated to reflect the current change.

The blocks PBA 0 and PBA 1 have become non-valid because the data in some of their sectors became obsolete. Accordingly, those blocks can then be recycled by the recycling FIFO 190. The recycling FIFO 190 has changed corresponding bits to 0 to indicated this. The write pointer 192 of the recycling FIFO 190 is incremented to point to next available position.

In the second phase of this write transaction, the data A5, B, and C0 are copied to new blocks, which are blocks PBA 3-4 to maintain consistency in the write LUT 170. The write LUT 170, the PUT 180, and the flash memory blocks reflect this update. The read LUT 172 will then be updated to reflect the current change. Also both phases of the write transaction are complete, the write and read LUTs 170 and 172 will be identical.

Figure 11:
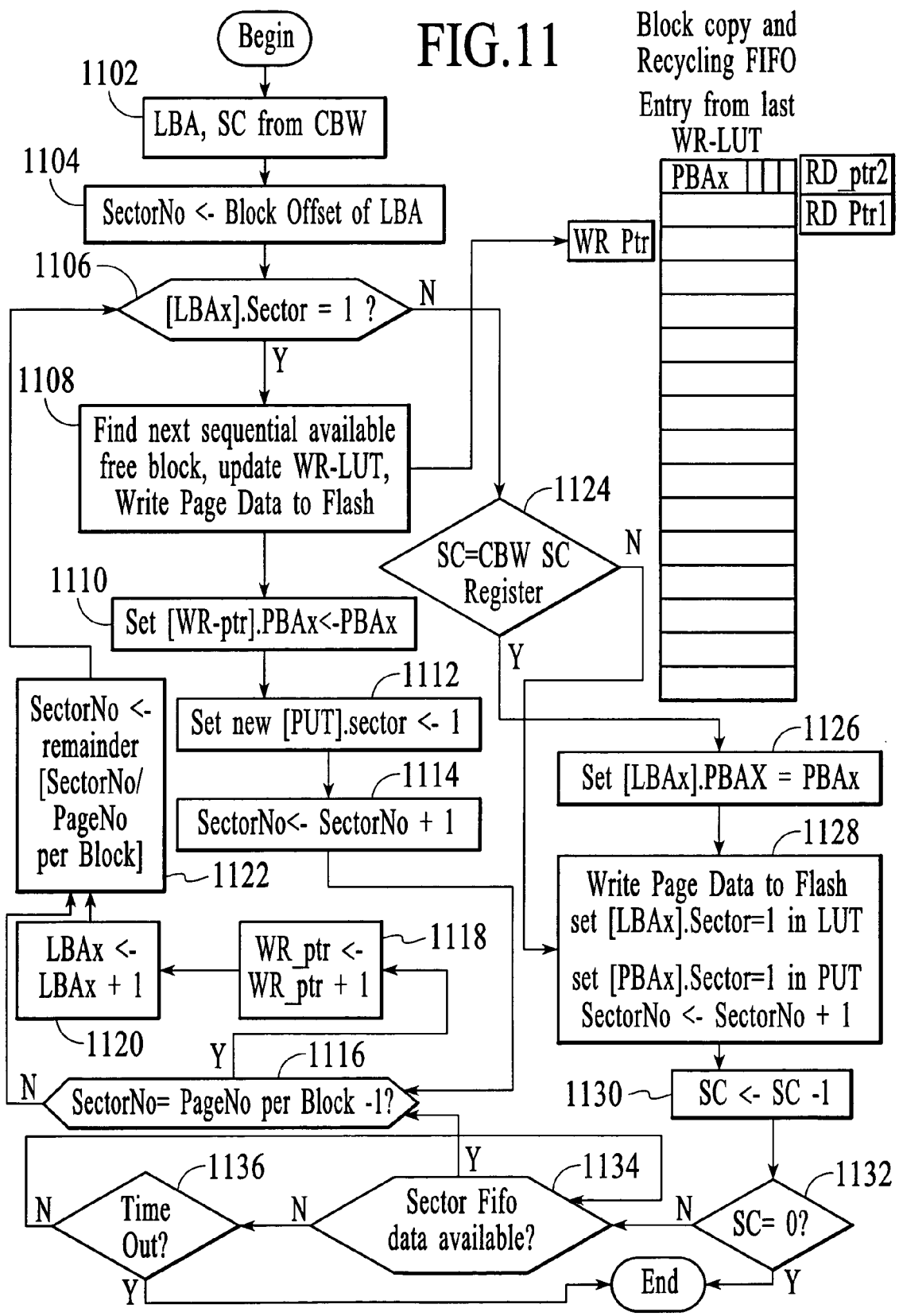
FIG. 11 is a flow chart showing a method for implementing the first phase of the write transaction of FIG. 9 in accordance with the present invention.

FIG. 11 is a flow chart showing a method for implementing the first phase of the write transaction of FIG. 9 in accordance with the present invention. First, an LBA from host system is evaluated, in a step 1102. Next, block offset bits are encoded into a sector number, in a step 1104. The LBA points to a PBA in the flash memory. For example, if LBA is 0010,0101 and sector number is 16, then 0010 will be the LBA for both LUT entry pointers. If the sector field of the PUT is 0, i.e., the sector is available, then the sector count register is equal to the CBW sector count and the PBA field of the write LUT will be loaded, in a step 1106.

If the sector field of LUT is 1, this means the flash sector is used by previous programming, and the write pointer is positioned to the block to be erased, in a step 1108. During the recycling operation, the block pointed to by the write pointer will be erased. Next, the sector number in the PUT is set to 1, in a step 1110, where the PBA indicates that the sector is being used. Next, the sector field in the PUT is set to 1, as in the step 1112. Next, the sector number in incremented, in a step 1114.

Next, the sector number is compared against the block boundary, in a step 1116. If the sector number is aligned with the block boundary, the write pointer is incremented, in a step 1118. The LBA in the write LUT is incremented, in a step 1120, when flash block boundary is reached. Next, the write LUT is updated with the correct sector number position, in a step 1122. If the sector count is not equal to the CBW sector count, i.e., the write transaction is not finished, the sector number field will be set to 1 and data will be written into the flash memory.

Referring back to the step 1106, if the sector field of LUT is 0, which means that the flash sector is not used by previous programming, the sector count is then compared to the sector count in the CBW, in a step 1124. If they are the same, the LBA is set to 1, in a step 1126. Next, the sector number is incremented, in a step 1128. If in the step 1124, the sector count is different from the sector count in the CBW, the sector count is decremented, in a step 1130.

Next, the sector count is checked, in a step 1132. If the sector count is equal to 0, the first phase of the write transaction terminates. If the sector count is not equal to 0, the means that the host system did not send the correct amount of data. Accordingly, the sector FIFO is checked to determine whether there is any more available data, in a step 1134. If not, a time-out sequence is executed, in a step 1136, to flag an abnormal flow termination, and the sector FIFO is continually checked until sufficient data is available. If there is more available data in the sector FIFO, the sector number is compared against the block boundary, as in the step 1116.

Figure 12:
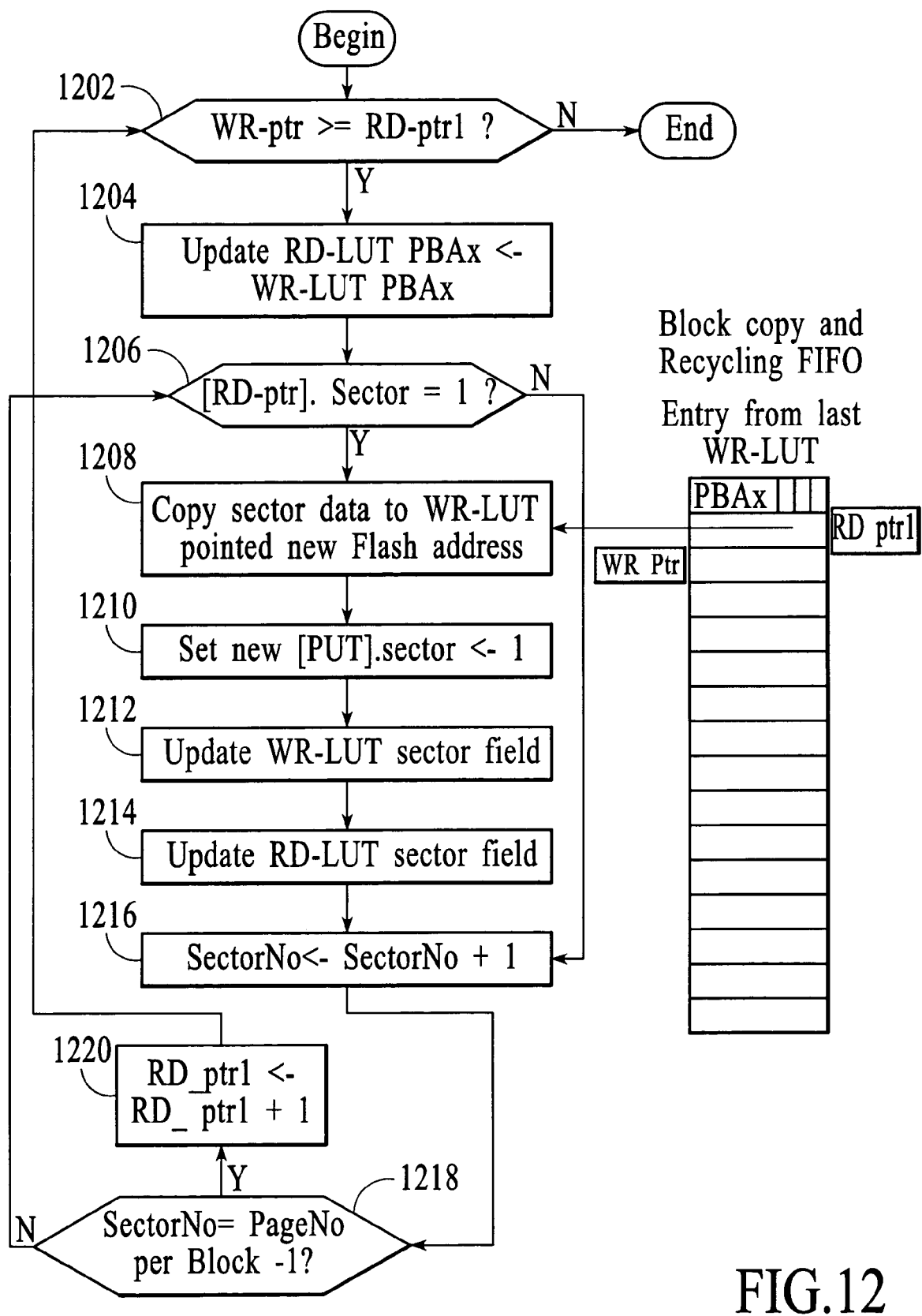
FIG. 12 is a flow chart showing a method for implementing the second phase of the write transaction of FIG. 9 in accordance with the present invention.

FIG. 12 is a flow chart showing a method for implementing the second phase of the write transaction of FIG. 9 in accordance with the present invention. First, the pointer values of the write and read pointers are compared, in a step 1202. The sector field from the recycling FIFO entry pointed to by the read pointer indicates that a valid sector needs to be copied to a new PBA in order to achieve consistency in the write LUT. When the copy is done, the read LUT is updated to be identical to the write LUT, in a step 1204. Next, the sector number pointed to by the read pointer is checked, in a step 1206. If the sector number is equal to 1, the data in that sector is copied to a new block, in a step 1208. Next, the sector number in the PUT is set to 1, in a step 1210. Next, the write LUT sector field is updated, in a step 1212. Next, the read LUT sector field is updated, in a step 1214. Next, the sector number in incremented, in a step 1216. Referring back to the step 1206, if the sector number is not equal to 1, the sector number is incremented, as in the step 1216.

The sector copying process will be completed as long as the sector number reaches the block boundary. The sector number is compared against the block boundary, in a step 1218. If the sector number is aligned with the block boundary, the read pointer is incremented, in a step 1220. Next, the read pointer is compared with the write pointer, as in the step 1202. If in the step 1218, the sector number is not aligned with the block boundary, the sector number pointed to by the read pointer is checked, as in the step 1206.

Figure 13:
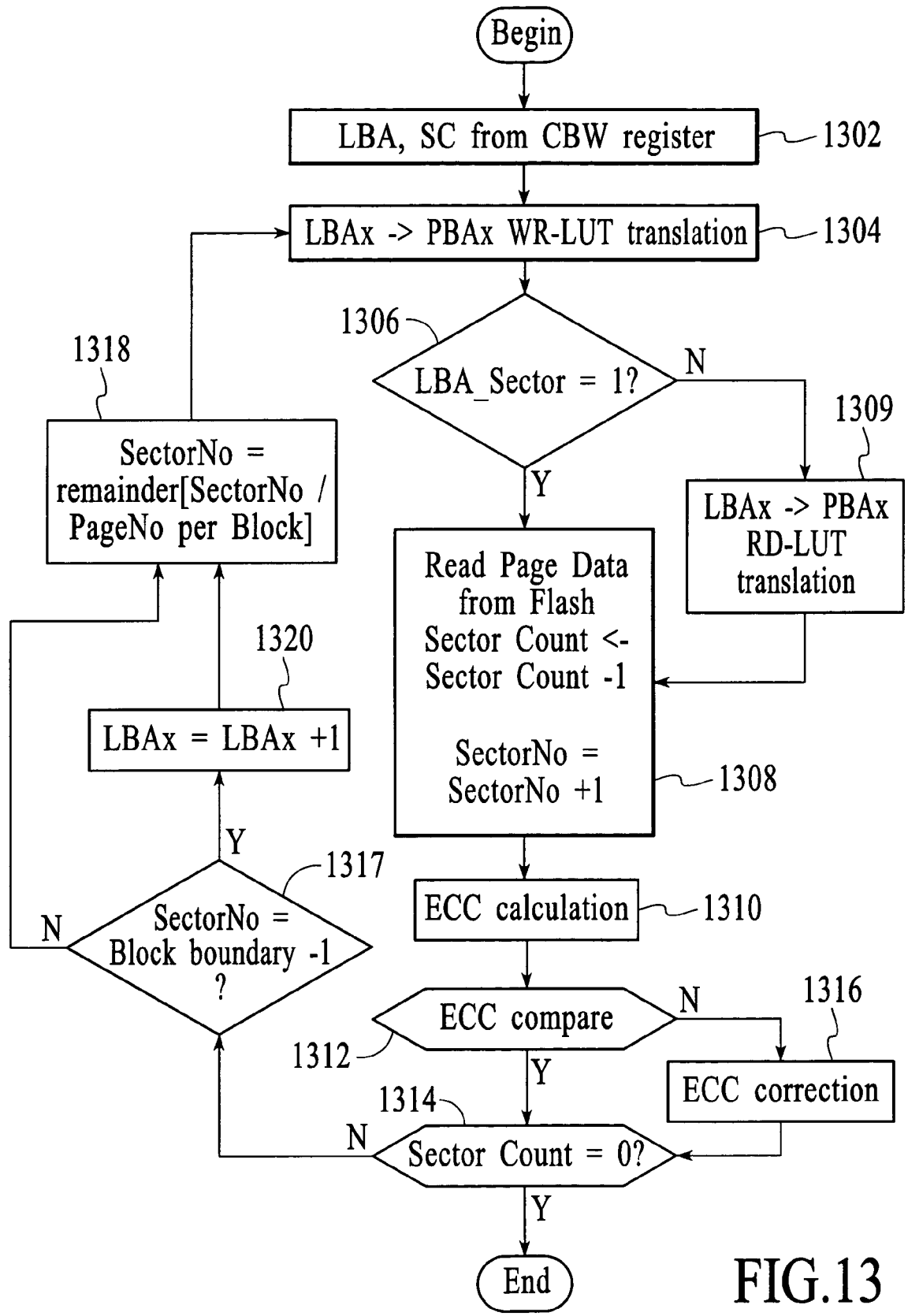
FIG. 13 is a flow chart showing a method for implementing the read transaction of FIG. 9 in accordance with the present invention.

FIG. 13 is a flow chart showing a method for implementing the read transaction of FIG. 9 in accordance with the present invention. First, a CBW is received and recognized as read request, and an LBA and sector count is loaded from the CBW, in a step 1302. Next, the LBA of the write LUT is translated into a corresponding PBA and sector number, in a step 1304. Next, the sector field bit is checked, in a step 1306. If the sector field bit is equal to 1, the data is read, the sector count is decremented, and the sector number is incremented in preparation for the next read transaction, in a step 1308. If the sector field bit is not equal to 1, i.e., equal to 0, the LBA of the read LUT is translated into a corresponding PBA, in a step 1309. Then the data is read, the sector count is decremented, and the sector number is incremented, as in the step 1308.

Next, an error correction code (ECC) calculation is performed, in a step 1310. Next, the EEC result is compared with a value read from the flash spare field, in a step 1312. If the values are identical, the sector count is checked, in a step 1314. If the values are not identical, an EEC correction is performed, in a step 1316, and then the sector count is checked, as in the step 1314. If the sector count has reached 0, i.e., equals 0, the read process terminates. If the sector count has not reached 0, the block boundary will also be checked, in a step 1317. If the sector number is not aligned with the block boundary, the read LUT is updated with the correct sector number position, in a step 1318. If the sector number is aligned with the block boundary, the LBA in the read LUT is incremented, in a step 1320, and then the read LUT is updated with the correct sector number position, as in the step 1318.

A read transaction is executed immediate after a first phase of a write transaction. The read transaction has a higher priority than the second phase of a previous write transaction. This ensures optimal responses by the flash memory system. A read transaction is significantly faster than a write transaction and read transactions do not result in bad block situations, which only occur during write transactions and erase operations.

A read transaction differs from a disk cache function whenever the contents in the sector FIFO are available. This can happen when the LBA in the read LUT matches the previous LBA in the write LUT. The disk cache concept is borrowed from magnetic hard disk concepts and applied to small-capacity flash storage. This feature is typically disabled to save cache cost.

Figure 14:
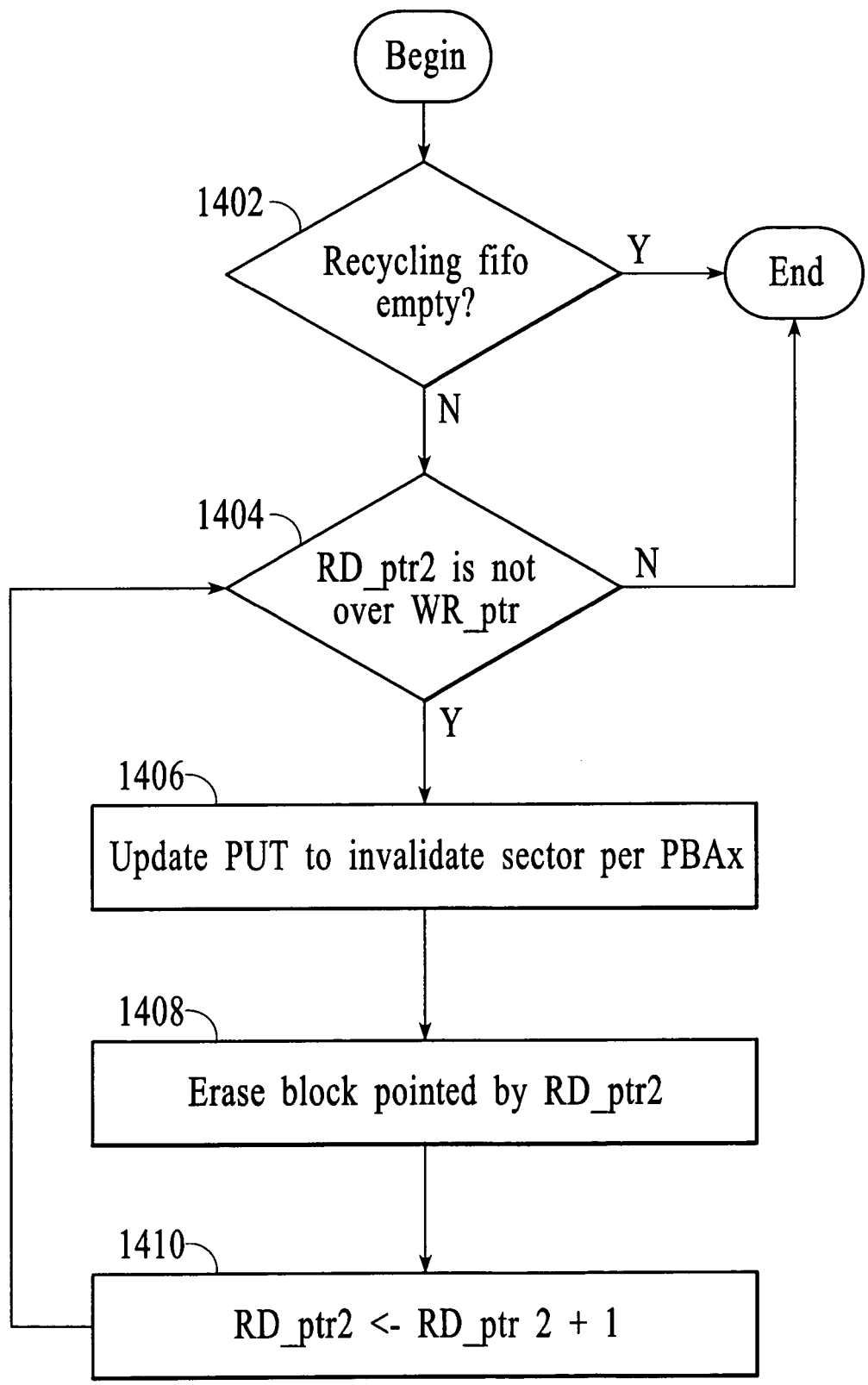
FIG. 14 is a flow chart showing a method for implementing the recycling operation of FIG. 9 in accordance with the present invention.

FIG. 14 is a flow chart showing a method for implementing the recycling operation of FIG. 9 in accordance with the present invention. First, the recycling FIFO is checked, in a step 1402. If the recycling FIFO is empty, the recycling operation terminates. If the recycling FIFO is not empty, the read pointer is checked, in a step 1404. The read pointer position should not overtake the write pointer. However, the write pointer may loop back to its original starting position if both read pointers are executed. If the read pointer is not positioned over the write pointer, the recycling operation terminates. If the read pointer is positioned over the write pointer, the corresponding bit in the PUT is cleared, i.e., 0, in a step 1406, to indicate that the physical block is available for reprogramming. Next, the read pointer is positioned to point to the block to be erased, in a step 1408. Next, the second read pointer is incremented, in a step 1410, for the next recycling operation.

Pointer comparison for the recycling FIFO can be achieved by adding one more bit to the index of both the write and read pointers. For example, if the recycling FIFO contains 8 PBA entries, 4 bits instead of 3 bits will be used for the pointers. The write pointer will start from 0 and increment to 7 and then cycle back to 0. The write pointer value should always be at least equal to or greater than the read pointers. When they are equal, it means that the recycling FIFO is empty. The depth, i.e., the number of entries, of the recycling FIFO affects the tradeoff between line-copy speed and the erase speed. Too few entries makes the recycling FIFO less optimal.

The flash memory controller of the present invention can perform multiple-block data access. The conventional flash memory device has a 512-byte page register built-in. The data write to the flash memory device has to write to the page register first and then to a flash memory cell. The conventional flash memory controller, as well as its built-in firmware, controls the flash memory access cycles. The conventional flash memory controller transfers one single block (512 bytes) of data to the page register of the flash memory device at a time. No other access to the flash memory is allowed once the 512 bytes page register is filled. Consequently, the conventional flash memory controller, which uses the single-block data access methodology, limits the performance of flash memory devices.

In accordance with the present invention, the flash memory controller utilizes a 2K or larger size page register. The flash memory controller of the present invention functions as a multiple-block access controller by sending multiple blocks of data simultaneously to a flash memory to fill up the page register. This significantly improves the performance of the data transfer. Compared to the conventional single-block data-transfer controller, which transfers a single block at a time, the data transfer performance using the flash memory controller of the present invention is significantly improved.

The flash memory controller of the present invention can also provide dual channel processing to improve performance of the flash memory system. Dual channeling provides a second channel, or "freeway," for executing transactions between the flash memory controller and the flash memory device. A conventional flash memory controller uses a single memory bus such that one or more flash memory devices attached to it. However, the conventional architecture limits the performance of the conventional flash memory controller.

In accordance with the present invention, at least two sets of memory buses are utilized. Each set of memory buses is coupled to separate flash memory devices. The memory controller can access flash memory devices together or separately. As a result, transactions can be executed twice as fast utilizing dual channel processing. Furthermore, each memory bus can also be further expanded to multiple sets of memory buses.

The flash memory controller of the present invention can also interleave operations. A conventional flash memory controller uses a single set of memory buses such that one or more flash memory devices are attached to it. However, the conventional flash memory controller can only access the flash memory devices one at a time. Accordingly, the conventional architecture limits the performance of the conventional flash memory controller.

In accordance with the present invention, at least one or two extra sets of memory control signals (such as separate Chip Enable and Busy signals) are utilized. Furthermore, a shared memory bus having at least two banks of flash memory devices are attached to the shared memory bus. The flash memory controller of the present invention can access one bank of flash memory devices while the other bank is busy reading or writing. Accordingly, the flash memory controller of the present invention fully utilizes the shared memory bus and thus significantly increase the performance. Furthermore, the number of pins of the flash memory controller are reduced by sharing memory IO and control signals. This minimizes the cost to make flash memory devices.

In accordance with the present invention, one in the art can integrate functions of multiple block access, multiple bank interleaving, and multiple channel operations together in a memory access cycle of a single chip to achieve maximum performance.

In accordance with the present invention, the flash memory controller can be applied to USB as well as ExpressCard plug and receptacle systems. Also, the flash memory controller can be applied to other embodiments involving multi-mode USB, Secure Digital (SD), MultiMediaCard (MMC), Memory Stick (MS), and Compact Flash (CF) plug and receptacle systems.

According to the system and method disclosed herein, the present invention provides numerous benefits. For example, it shifts the management of the flash memory and related intelligence from the host system to the flash memory controller so that the host system interacts with the flash memory controller without the host system having information regarding the configuration of the flash memory. For example, the flash memory controller provides LBA-to-PBA translation, obsolete sector recycling, and wear leveling. Furthermore, the recycling operations are performed in the background. Furthermore, flash specific packet definitions and flags in the flash memory are eliminated. Furthermore, the flash memory controller provides multiple-block data access, dual channel processing, and multiple bank interleaving. Consequently, speeds at which data is written to and read from the flash memory is significantly increased while the flash memory remains compatible with the USB standard and ASIC architecture.

A system and method in accordance with the present invention for controlling flash memory are disclosed. The system and method comprise a processor for receiving at least one request from a host system, and an index, which comprises look-up tables (LUTs) and a physical usage table (PUT). The index translates logical block addresses (LBAs) provided by the host system to physical block addresses (PBAs) in the flash memory. The index also contains intelligence regarding the flash memory configuration. The processor can utilize the index to determine the sectors of the flash memory that are available for programming, reprogramming, or reading. The flash memory controller further comprises a recycling first-in-first-out (FIFO) that recycles blocks of obsolete sectors so that they are available for reprogramming. The recycling operation involves copy and erase operations, and is performed in the background and thus hidden from the host system. Accordingly, the management of the flash memory and related intelligence resides in the flash memory controller instead of in the host system. As a result, the host system interacts with the flash memory controller without the host system having information regarding the configuration of the flash memory. Consequently, speeds at which data is written to and read from the flash memory is significantly increased while the flash memory remains compatible with the USB standard and ASIC architecture.

Although the present invention has been described in accordance with the embodiments shown, one of ordinary skill in the art will readily recognize that there could be variations to the embodiments and those variations would be within the spirit and scope of the present invention. Embodiments of the present invention can be implemented using hardware, software, a computer readable medium containing program instructions, or combination thereof. Accordingly, many modifications may be made by one of ordinary skill in the art without departing from the spirit and scope of the appended claims.

What is claimed is:

1. A method for managing flash memory, the method comprising:

(a) receiving at least one request from a host system utilizing a processor within a flash memory controller;

(b) determining which sectors of the flash memory are available for programming, reprogramming, or reading utilizing the processor and an index within the flash memory controller, wherein the host system interacts with the flash memory controller without the host system having information regarding a configuration of the flash memory; and (c) recycling obsolete sectors so that they are available for reprogramming, wherein the recycling step (c) comprises:

(c1) block copying valid data from sectors of a first block to sectors of a second block, wherein the sectors of the first block become obsolete sectors; and (c2) erasing the obsolete sectors of the first block so that they are available for reprogramming.

2. A computer readable medium containing program instructions for managing flash memory, the program instructions which when executed by a computer system cause the computer system to execute a method comprising:

(a) receiving at least one request from a host system utilizing a processor within a flash memory controller; and (b) determining which sectors of the flash memory are available for programming, reprogramming, or reading utilizing the processor and an index within the flash memory controller, wherein the host system interacts with the flash memory controller without the host system having information regarding a configuration of the flash memory; and (c) program instructions for recycling obsolete sectors so that they are available for reprogramming, wherein the recycling step (c) comprises program instructions for:

(c1) block copying Valid data from sectors of a first block to sectors of a second block, wherein the sectors of the first block become obsolete sectors; and (c2) erasing the obsolete sectors of the first block so that they are available for reprogramming.

* * * * *